(12) United States Patent
Brackman

(10) Patent No.: US 6,547,419 B1
(45) Date of Patent: Apr. 15, 2003

(54) LIGHT SCREEN

(76) Inventor: David M. Brackman, 7665 Pinehurst Rd., Mentor-on-the-Lake, OH (US) 44060

( * ) Notice: Subject to any disclaimer, the term of this patent is extended or adjusted under 35 U.S.C. 154(b) by 0 days.

(21) Appl. No.: 09/711,182

(22) Filed: Nov. 12, 2000

(51) Int. Cl.[7] .................................................. F21V 33/00
(52) U.S. Cl. ........................ 362/253; 362/127; 362/311; 362/367
(58) Field of Search ................................. 362/253, 127, 362/128, 129, 130, 131, 132, 133, 134, 311, 367

(56) References Cited

U.S. PATENT DOCUMENTS

| 4,005,239 | A | | 1/1977 | Davis et al. |
|---|---|---|---|---|
| 4,025,663 | A | * | 5/1977 | Brandt .................. 427/161 |
| 4,641,918 | A | | 2/1987 | Moffatt et al. |
| 5,064,592 | A | | 11/1991 | Ueda et al. |
| 5,277,952 | A | | 1/1994 | Watras |
| 5,431,761 | A | | 7/1995 | Holztrager |
| 5,951,154 | A | | 9/1999 | Carel et al. |
| 5,989,657 | A | | 11/1999 | Würz et al. |
| 6,041,836 | A | | 3/2000 | Murai |
| 6,065,236 | A | | 5/2000 | Schneider |

* cited by examiner

Primary Examiner—Sandra O'Shea
Assistant Examiner—Ronald E. DelGizzi
(74) Attorney, Agent, or Firm—Forrest L. Collins

(57) ABSTRACT

Disclosed herein of formation and use of decorative articles utilizing a natural wooden veneer which is back lit and thereby highlighted by a light source which brings out the beauty of the natural grain of the wooden which utilized to form a thin wooden veneer. A variety of natural wooden veneers may be utilized including oak, cherry, maple, walnut, and birch. Alternatively, a synthetic thin wooden veneer may be utilized in the present invention.

15 Claims, 3 Drawing Sheets

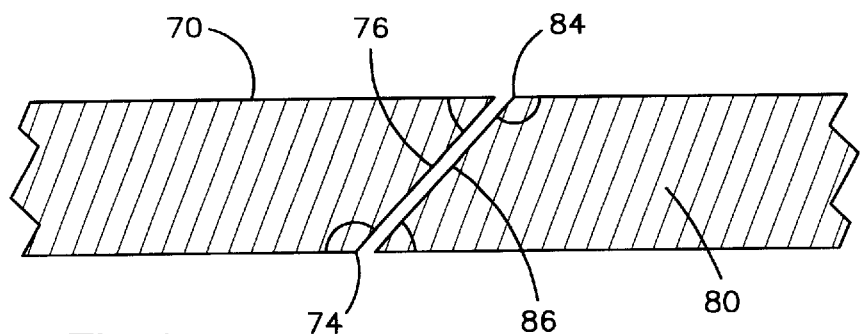
Fig.4
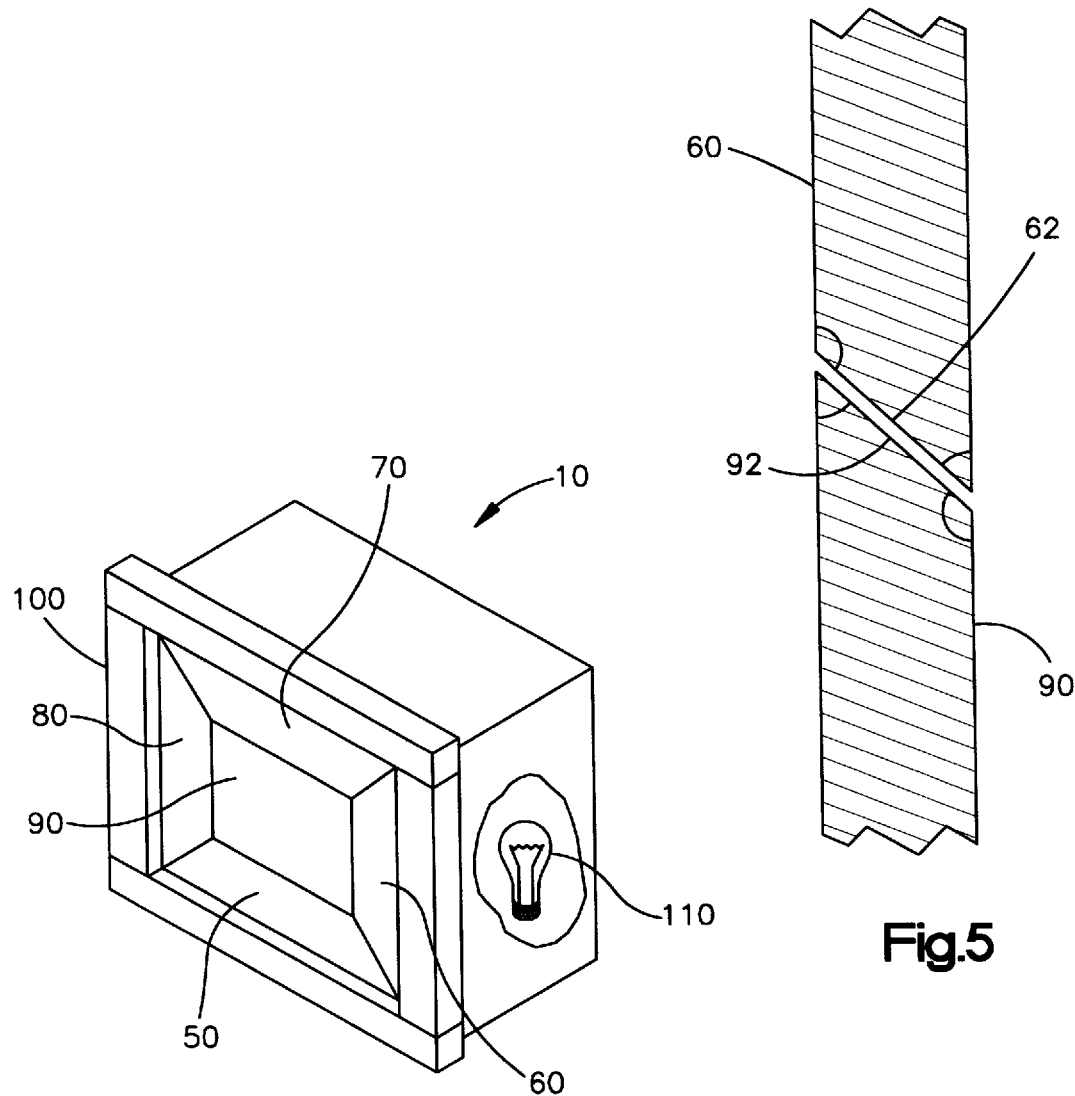
Fig.5
Fig.6

LIGHT SCREEN

BACKGROUND

The present invention relates to the field of decorative objects and in particular to decorative objects where the decorative effect is obtained by passing light through a wooden veneer.

DESCRIPTION OF THE ART PRACTICES

U.S. Pat. No. 5,951,154 to Carel, et al. issued Sep. 14, 1999 describes a lighted planter includes a lighting assembly removably supported on the upper rim of a planter box. The planter box of the Carel, et al. patent describes a lighting assembly provides nested inner and outer frames, separated by an array of stained glass panels, defining a channel containing a wrap-around lighting element.

U.S. Pat. No. 6,041,836 naming Murai as the inventor issued Mar. 28, 2000. The Murai patent disclosed a veneer which has the cross grain (such as wavy grain and interlocked grain) artificially formed on the surface of straight-grained veneer cut by quarter sawing the wooden.

Wurz, et al. in U.S. Pat. No. 5,989,657 issued Nov. 23, 1999 describes a trim strip which has a bar of an at least partially transparent plastic having parallel inner and outer faces, an opaque decor layer laminated to the inner face, and a layer of adhesive on the opaque decor layer. The trim strip of Wurz, et al. is adhered to a board edge with the decor layer against the board edge and the outer face directed away therefrom, and edges of the trim strip at the outer face are machined with removal of material so that the decor layer is left exposed through the bar at the machined edges.

U.S. Pat. No. 6,065,236 to Schneider issued May 23, 2000 recites a framing system for mounting photographs, artwork, documents, etc. on a wall includes a molding strip and an envelope having a clear front panel, with the envelope slidably engageable into the molding strip. The molding strip of Schneider includes a slot, and the envelope includes an upper edge having a configuration matching the slot.

Moffatt, et al. in U.S. Pat. No. 4,641,918 issued Feb. 10, 1987 discloses a free-standing collapsible panoramic theatre is described. When assembled, the theatre includes a multiplicity viewing region. U.S. Pat. No. 4,005,239 issued to Davis, et al. Jan. 25, 1977 shows a decorative laminated panel and a process for making such a panel comprising (1) coating the back most flat surface of a laminate with a uniform layer of a solution of an elastomeric adhesive and removing excess solvent, (2) coating one face of a compressible, flexible, closed; cell polypropylene plastic foam sheet with a solution of an elastomeric adhesive and removing solvent, (3) superimposing the decorative laminate over said polypropylene plastic foam sheet with the adhesively coated side of the laminate facing the adhesively coated side of the polypropylene foam, (4) applying pressure to the flat surface of the laminate and plastic foam so as to form a unitary panel. To bond said decorative laminated panel of the Davis et al., patent to a substrate it is suggested that one can apply an elastomeric adhesive to the back of the panel and to a rigid substrate and install the panel by pressing against the rigid substrate to which the panel is to be attached.

U.S. Pat. No. 5,431,761 issued Jul. 11, 1995 to Holztrager recites a process for making a decorative panel uses a backboard made of polycarbonate plastic material having a pair of substantially parallel spaced apart walls secured by a plurality of parallel spaced apart ribs disposed between the walls. A decorative laminate is glued to the backboard. U.S. Pat. No. 5,277,952 to Watras issued on Jan. 11, 1994 describes the method of making a decorative cracked glass laminate in tile, panel, sheet, plate, veneer or in situ form. The decorative cracked glass laminate of Watras comprises three layers laminated together, an inner backing layer, a substantially light-transparent outer layer, and a decoratively cracked glass intermediate layer sandwiched between the inner and outer layers.

U.S. Pat. No. 5,064,592 issued to Ueda et al., Nov. 12, 1991 recites a process of producing a surface hardened woodeny decorative sheet by reacting a cellulose material such as a wooden flour, a wooden chip, a chaff, etc., with a dibasic acid anhydride and a monoepoxy compound having a polymerizable double bond to form a setting composition mainly composed of an oligoesterified cellulose material having a polymerizable double bond and an oligomer having a polymerizable double bond, placing in layer the setting composition on a woodeny sheet, and hot-pressing them to integrate the setting composition and the woodeny sheet in a body.

Throughout the specification and claims, percentages and ratios are by weight, and temperatures are in degrees Celsius unless otherwise indicated. To the extent that any of the references cited herein are applicable, they are hereby specifically incorporated by reference. Ranges and ratios given herein may be combined.

SUMMARY OF THE INVENTION

The present invention describes a decorative object comprising:
- a first sheet of wooden veneer having a plurality of surfaces,
- said sheet of wooden veneer having a wooden grain pattern on at least one
- surface thereof,
- a sheet of a transparent material having a plurality of surfaces,
- an adhesive material disposed between a surface of said sheet of wooden veneer and a surface of said sheet of a transparent material, said adhesive material contacting said surface of said sheet of wooden veneer and said surface of said sheet of transparent material.

A further aspect of the present invention is a decorative object comprising:
- a first sheet of wooden veneer having a plurality of surfaces, said sheet of wooden veneer having a wooden grain pattern on at least one surface thereof,
- a sheet of a transparent material having a plurality of surfaces,
- an adhesive material disposed between a surface of said sheet of wooden veneer and a surface of said sheet of a transparent material,
- said adhesive material contacting said surface of said sheet of wooden veneer and said surface of said sheet of transparent material, and a lighting source provided further that said transparent material is disposed between said sheet of wooden veneer and said lighting source.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a sectional view taken along lines 4—4 in FIG. 3;

FIG. 5 is a sectional view taken along lines 5—5 of FIG. 3;

FIG. 6 is a finished product according to the present invention;

With more particular reference to the drawings the following is set forth.

DETAILED DESCRIPTION OF THE INVENTION

For the purposes of promoting an understanding of the principles of the invention, reference will now be made to the preferred embodiment. No limitation of the scope of the invention is thereby intended for further applications of the principles of the invention, which would normally occur or be contemplated by one skilled in the art to which the invention relates.

Figure 1:
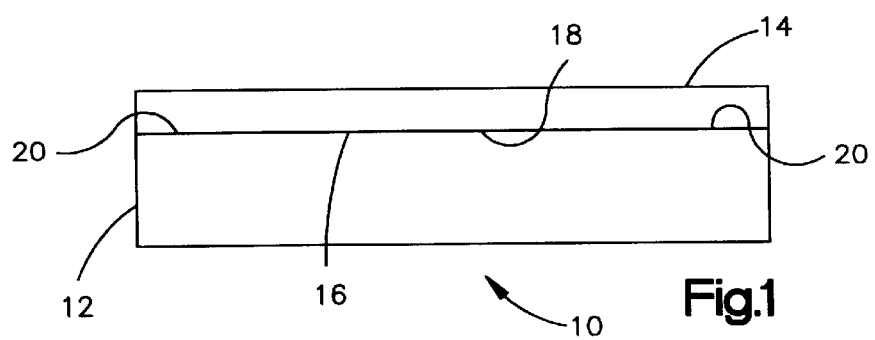
FIG. 1 is a side view of an embodiment of the invention.

As best seen him in FIG. 1 is a basic embodiment 10 of the present invention that is a portion of a decorative article. A transparent substrate 12 is typically formed as a piece of glass, polycarbonate or other substantially transparent material. A thin piece of a wooden veneer 14 is adhered to the transparent substrate 12 by means of a thin layer of an adhesive 16.

The thin layer of adhesive 16 is spread evenly so that it covers substantially all of bottom surface 18 of the thin piece of wooden veneer 14. The thin layer of adhesive 16 is also spread evenly over the upper surface 20 of the transparent substrate 12. The thin layer of adhesive 16 is desirably a transparent material when the adhesive cures. Of course, if the thin layer of adhesive and 16 is spread sufficiently thin it may also be a semi-opaque material when the adhesive cures.

Figure 2:
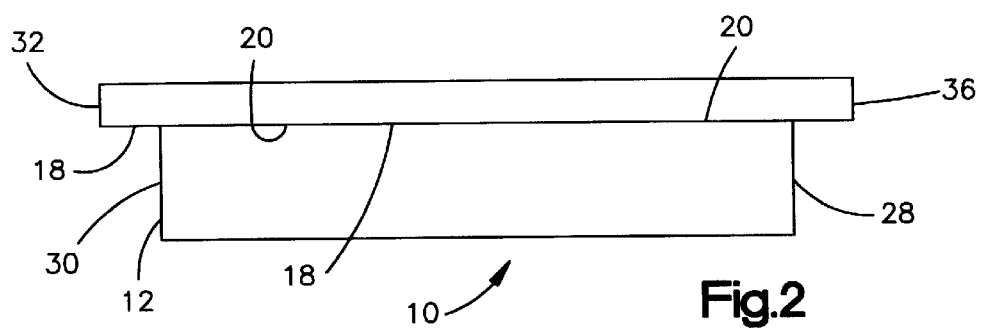
FIG. 2 is an alternative side view of an embodiment of the present invention.

As best seen in FIG. 2 is a further portion of the decorative article 10. The transparent substrate 12 is shown as having a first end portion 28. The transparent substrate 12 is also shown as having a second end portion 30. The thin piece of wooden veneer 14 is shown as having a first end portion 32. The thin piece of wooden veneer 14 is shown as having a second end portion 36.

The first end portion of 32 of the thin piece of wooden veneer 14 extends beyond the first end portion 28 of the transparent substrate 12. The second end portion 36 of the thin piece of wooden veneer 14 extends beyond the second end portion 30 of the transparent substrate 12.

The purpose of having the end portions 32 and 36 of the thin wooden veneer 14 extend beyond the end portions 28 and 30 of the transparent substrate 14 is to permit shrinkage of the wooden veneer 14 to the approximate dimensions of the transparent substrate 14. As shown later, the present invention allows for illumination through the transparent substrate 12 thereby providing highlights of the natural wooden grain in the thin wooden veneer 14. As incandescent heat may be utilized to provide highlighting effect the waste heat may shrink a natural wooden veneer 14. By permitting the first end portion 32 and the second end portion 36 to extend beyond the dimensions defined by the first end portion 28 and the second end portion 30 of the transparent substrate 14 the shrinkage will be within acceptable values. While not shown, it may be taken that the entire dimensions of the thin wooden veneer 14 will extend beyond that the perimeter of the transparent substrate 12.

The thin layer of wooden veneer 14 may be adhered to the transparent substrate 12 by moderate pressure. Conveniently, a roller may be used to apply the thin layer of adhesive 16 to the transparent substrate 12. As the thin layer of wooden veneer 14 may be torn by as little force as may be applied by slight hand pressure it is preferred not to apply the adhesive 16 to the thin layer of wooden or 14.

The thin layer of wooden veneer 14 is preferably applied to be transparent substrate 12 while the adhesive 16 is in a relatively liquid state. In the foregoing manner, the thin wooden veneer 14 may be positioned on the transparent substrate 12 and slid into position utilizing the adhesive as a liquid vehicle to enhance mobility of the thin wooden veneer 14. A roller may then be utilized to facilitate obtaining a close fit to the thin wooden veneer 14 to the transparent substrate 12. In this matter, the adhesive will be spread smoothly to obtain the thin layer of adhesive 16 over substantially all of the bottom surface 18 of thin layer of wooden veneer 14 and spread evenly over the upper surface 20 of the transparent substrate 12.

Figure 3:
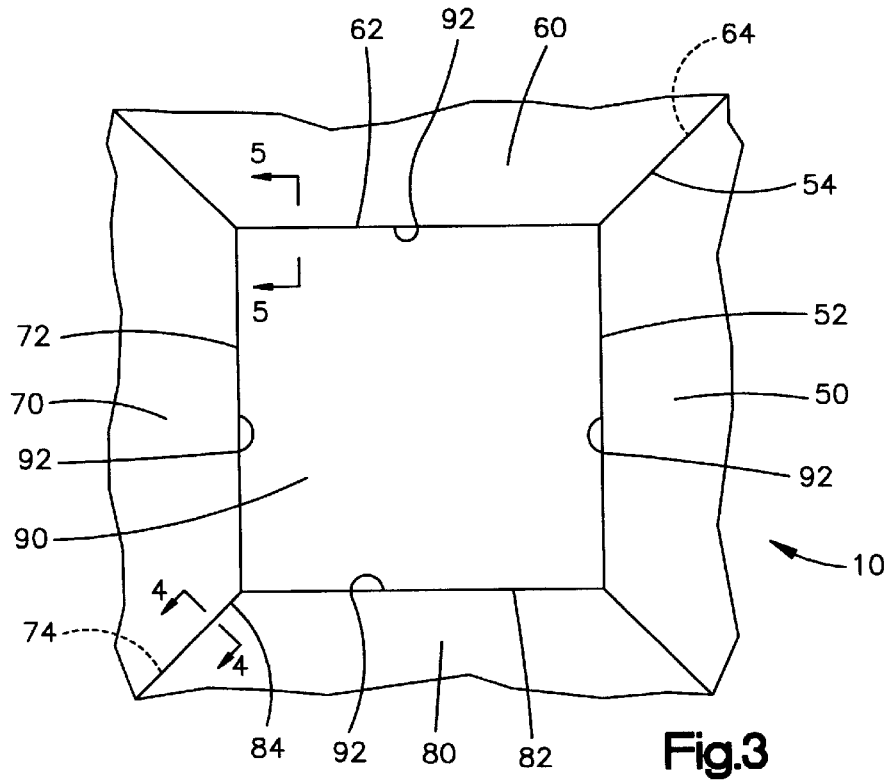
FIG. 3 is a bottom view of an embodiment of the present invention.

As best seen in FIG. 3, is a bottom view of the decorative article 10 according to the present invention. The decorative article 10 is shown as partially formed. The decorative article 10 is comprised of other first side piece 50, a second side piece 60, a third side piece 70, and a fourth side piece 80. Each of first side piece 50, the second side piece 60, the third side piece 70, the fourth side piece 80 are formed as shown in FIG. 1 from the transparent substrate 12 combined with a thin piece of wooden veneer 14 which are adhered together with an adhesive 16.

The first side piece 50 abuts the second side piece 60 and the fourth side piece 80. The second side piece 60 also abuts the third side piece 70. The third side piece 70 also abuts the fourth side piece 80. The are a fourth side piece 80 is located between the first side piece 50, and the third side piece 70.

A central piece 90 has a generally rectangular shape. The central piece 90 is formed as in FIG. 1 from a transparent substrate 12 combined with a thin piece of wooden veneer 14 and are adhered together with an adhesive 16.

The first side piece 50 has a side surface 52 abutting one of the four sides 92 of the central piece 90. The second side piece 60 has a side surface 62 abutting a second of the four sides 92 of the central piece 90. The third side piece 70 has a side surface 72 abutting a third of four sides 92 of the central piece 90. The fourth side piece 80 has a side surface 82 abutting a fourth side 92 of the central piece 90.

The grain of the thin piece of wooden veneer 14 in the central piece 90 may be the same or different as that employed in each of the first side piece 50, the second side piece 60, the third side piece 70, and the fourth side piece 80. The type of wooden utilized in the central piece 90 may be the same or different as unemployed in each of the first side piece 50 the second side to 60 the third side piece 70 and the fourth side piece 80.

For aesthetic purposes, the thin piece of wooden veneer 14 utilized in the central piece 90 will be different than that used for each of the first side piece 50, the second side piece 60 the third side piece 70 and the fourth side piece 80. Also for aesthetic purposes, it is preferred that all of the first side piece 50, the second side piece 60, the third side piece 70 and the fourth side piece 80 be made of the same type of wooden veneer in each case. Alternatively, the first side piece 50 and the third side piece 70 may be made the same type of wooden as is the thin piece of wooden veneer 14. In this last embodiment, the second side piece 60 is made of the same type of wooden as the fourth side piece 80.

As best seen in FIG. 4, is a partial sectional view taken along the lines 4—4 in FIG. 3. Referring back FIG. 3, a small gap 74 is located on the reverse side of the decorative article 10. A small gap 84 exists between the third side piece 70 and the fourth side piece 80. A beveled edge 76 is formed in the third side piece 70. A second beveled edge 86 is formed in the fourth side piece 80. The beveled edge 76 is cut at a 45 degree angle in the third side piece 70. The beveled edge 86 is cut at a 45 degree angle in the fourth side piece 80. The beveled edge 76 and the beveled edge 86 form complementary angles.

The purpose of cutting the beveled edge 76 and the beveled edge 86 is so that when a light source is placed under the plane of the surface of the decorative article 10 as shown in FIG. 3 is that any shrinkage of the thin piece of wooden veneer 14 from which the third side piece 70 is formed and any shrinkage that occurs in the thin piece of wooden veneer 14 from which the fourth side piece 80 is formed will minimize the amount of light which might otherwise directly pass from the light source.

As best seen in FIG. 3, and in a similar fashion FIG. 4, the small gap 54 in the first side piece 50 and the small gap 64 shown in the second side piece 60 are protected against light shining through the decorative article 10 by similar beveled edges. In a similar fashion the central piece 90 is formed so that the four sides 92 of the central piece 90 have four 45 degree beveled edges 92 on each of its sides which abut each of the first side piece 50, the second side piece 60, the third side piece 70, and the fourth side piece 80.

As best seen in FIG. 5 is a partial sectional view taken along lines 5—5 in FIG. 3. For purposes of the exemplification, there is a beveled surface 66 along the side surface 62 of the second side piece 60. The angle of the beveled surface 66 is 45 degrees. Each of the four sides 92 of the central piece 90 have a beveled edge cut at a 45 degree angle. The beveled edges of the four sides 92 of the central piece 90 are complementary to, for example, the beveled surface 66 along the side surface 62 of the second side piece 60.

Shown in FIG. 6 is a perspective view of a decorative article 10 of the present invention. A frame 100 is added to the decorative article 10 to retain the first side piece 50, the second side piece 60, the third side piece 70, and the fourth side piece 80 in place. The transparent substrate 12 upon which each of the sides is mounted is not shown in FIG. 6. The central piece 90 is held in place by the adhesive material 16 on the transparent substrate 12. In the event of adhesive failure, the beveled edges of the first side piece 50, the second side piece 60, the third side piece 70, and the fourth side piece 80 retain the corresponding complementary beveled edges of the central piece 90 in place.

A light source 110 is shown in the broken away portion of the decorative article 10 in FIG. 6. The light source 110 is conveniently an incandescent electrical light bulb of sufficient wattage to illuminate through the transparent substrate 12 to bring up the highlights of the natural wooden grain pattern in the first side piece 50, the second side piece 60, the third side piece 70, the fourth side piece 80, and also the central piece 90. If desired, a fluorescent or halogen light source may be employed as the light source 110. Practical considerations of each embodiment of the invention will determine to the proper selection of the light source 110.

Figure 7:
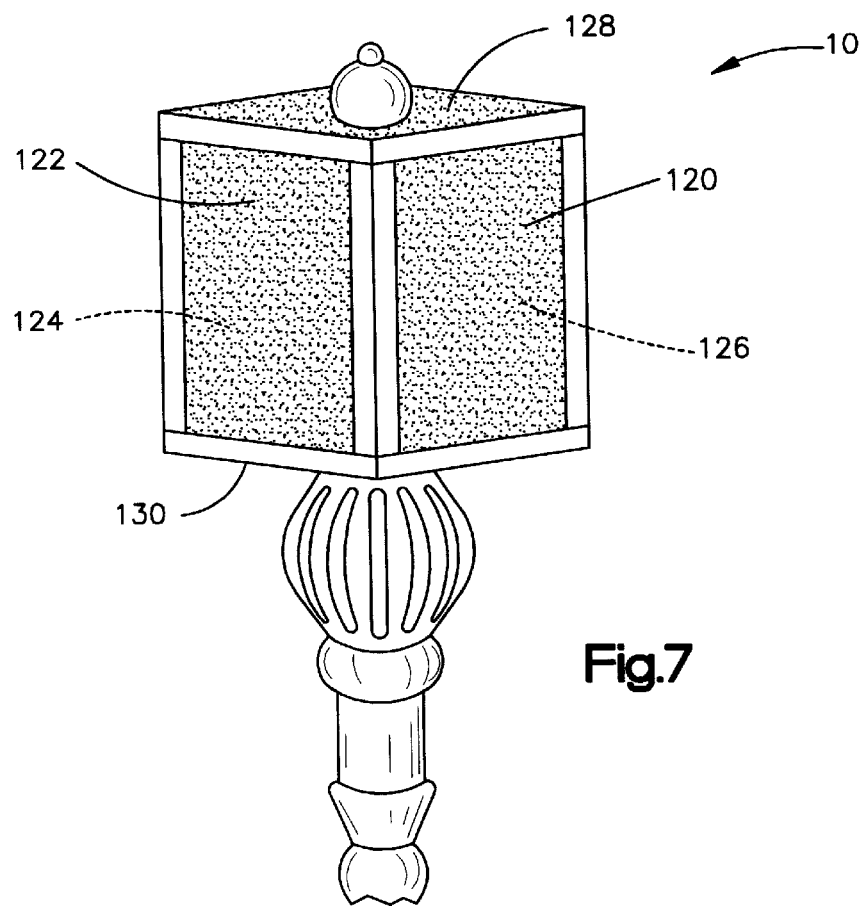
FIG. 7 is a cut out perspective view of the finished product of FIG. 6.

As best seen in FIG. 7 is a coach lamp version of the decorative article 10. The coach lamp shown in FIG. 7 has the decorative article 10 has a first side 120, a second side 122, a third side 124, a fourth side 126, a top side 128, and a bottom side 130. Each of the first side 120, the second side 122, the third side 124, the fourth side 126, the top side 128, and the bottom side 130 are assembled according to the complements the FIG. 1. Accordingly, a light source (not shown) from within the coach lab version of the decorative article 10 will illuminate all six sides bringing out the natural wooden grain of the thin wooden veneer 14.

Figure 8:
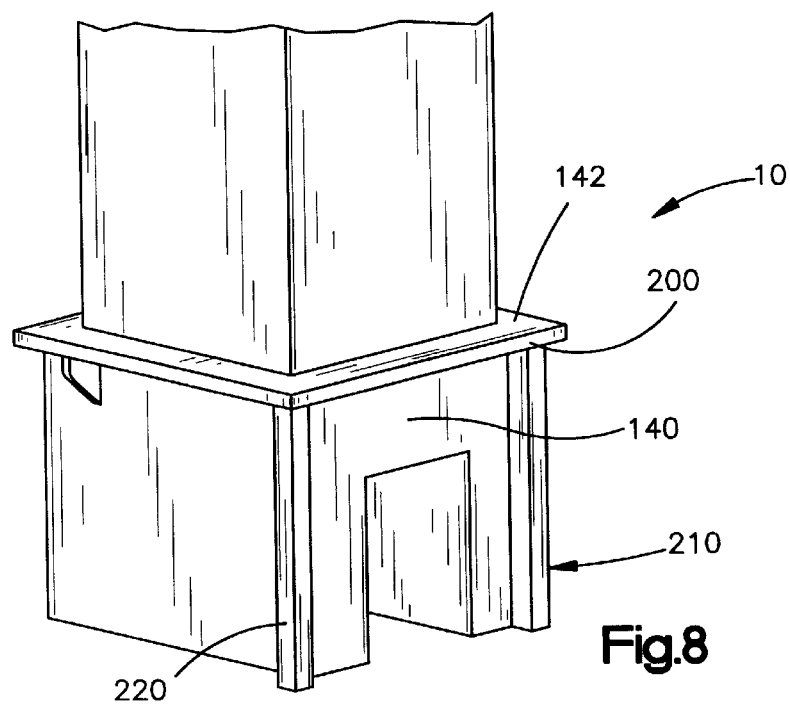
FIG. 8 is an alternative embodiment of the present invention.

As best seen in FIG. 8 is a perspective of a fireplace 140. The fireplace 140 has a mantel 142. Within the mantel 142 is located an artificially lit (by a fluorescent light) decorative area 200. Two vertical columns 210 and 220 are located on the fireplace 140. Two decorative articles 10 which form the vertical columns 210 and 220 of the fireplace 140 have arcuate services. When a fire is burning in the fireplace 140, the light generated by such a fire is radiating through the two vertical columns 210 and 220 bringing out the natural wooden grain of the thin wooden veneer 14.

The various embodiments of the present invention are simply meant to be illustrative and are not meant to be limiting as to other embodiments of the present invention. Therefore, the present invention is described in the appended claims.

What is claimed is:

1. A decorative object comprising:
    a first sheet of wooden veneer having a plurality of surfaces, said sheet of wooden veneer having a wooden grain pattern on at least one surface thereof,
    a sheet of a transparent material having a plurality of surfaces,
    an adhesive material disposed between a surface of said sheet of wooden veneer and a surface of said sheet of a transparent material,
    said adhesive material contacting said surface of said sheet of wooden veneer and said surface of said sheet of transparent material, and said first sheet of wooden veneer being a part of a lamp.

2. The decorative object according to claim 1 wherein said wooden veneer is a natural wooden veneer.

3. The decorative object according to claim 1 wherein said transparent material is glass.

4. The decorative object according to claim 1 wherein said transparent material is polycarbonate.

5. The decorative object according to claim 1 wherein said adhesive material is a cyanoacrylate.

6. The decorative object according to claim 1 wherein at least one of the length and width of said sheet of wooden veneer is greater than the corresponding length and width of said transparent material.

7. The decorative object according to claim 1 wherein the length of said first sheet of wooden veneer is greater than the corresponding length of said transparent material.

8. The decorative object according to claim 1 wherein the width of said sheet of wooden veneer is greater than the corresponding width of said transparent material.

9. The decorative object according to claim 1 comprising a second sheet of wooden veneer.

10. The decorative object according to claim 1 comprising at least a plurality of sheets of wooden veneer and provided further that at least two sheets of wooden veneer abut one another at the edges thereof.

11. The decorative object according to claim 1 comprising at least two sheets of wooden veneer and provided further that at least two sheets of wooden veneer abut one another at the edges thereof, and provided further that said edges are beveled.

12. The decorative object according to claim 1 wherein the sheet of wooden veneer and the transparent material are each substantially planar.

13. The decorative object according to claim 1 wherein said sheet of wooden veneer and said transparent material are each substantially arcuate.

14. The decorative object according to claim 1 further comprising a lighting source wherein further that said transparent material is disposed between said sheet of wooden veneer and said lighting source.

15. A decorative object comprising:

a first sheet of wooden veneer having a plurality of surfaces, said sheet of wooden veneer having a wooden grain pattern on at least one surface thereof, a sheet of a transparent material having a plurality of surfaces, an adhesive material disposed between a surface of said sheet of wooden veneer and a surface of said sheet of a transparent material, said adhesive material contacting said surface of said sheet of wooden veneer and said surface of said sheet of transparent material, and a lighting source wherein provided further that said transparent material is disposed between said sheet of wooden veneer and said lighting source.

* * * * *